US011200616B2

(12) United States Patent
Han

(10) Patent No.: US 11,200,616 B2
(45) Date of Patent: Dec. 14, 2021

(54) ELECTRONIC FILE TRANSMISSION METHOD, DEVICE, SYSTEM, AND COMPUTER READABLE STORAGE MEDIUM

(71) Applicant: BOE Technology Group Co., Ltd., Beijing (CN)

(72) Inventor: Litong Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 16/117,318

(22) Filed: Aug. 30, 2018

(65) Prior Publication Data
US 2019/0213662 A1    Jul. 11, 2019

(30) Foreign Application Priority Data

Jan. 9, 2018   (CN) .......................... 201810020195.4

(51) Int. Cl.
G06Q 30/06         (2012.01)
H04L 29/08         (2006.01)

(52) U.S. Cl.
CPC ......... G06Q 30/0635 (2013.01); H04L 67/06 (2013.01); H04L 67/1097 (2013.01); H04L 67/18 (2013.01); H04L 67/2847 (2013.01)

(58) Field of Classification Search
CPC . G06Q 30/0635; H04L 67/06; H04L 67/1097; H04L 67/18; H04L 67/2847
(Continued)

(56) References Cited

U.S. PATENT DOCUMENTS 8,843,758 B2 * 9/2014 Dharmarajan ...... H04L 63/0428
                                                   713/185
9,247,463 B1 * 1/2016 Guo ........................ H04W 4/80
(Continued)

FOREIGN PATENT DOCUMENTS

CN    101496050 A    7/2009
CN    104735481 A    6/2015
(Continued)

OTHER PUBLICATIONS

Nygren, Erik, et al; "The Akamai Network: A Platform for High-Performance Internet Applications"; Jul. 17, 2010; ACM SIGOPS Operating Systems Review vol. 44 Issue 3, pp. 2-19 (Year: 2010).*
(Continued)

Primary Examiner — Brittney N Miller
Assistant Examiner — Thomas Joseph Sullivan
(74) Attorney, Agent, or Firm — Fay Sharpe LLP

(57) ABSTRACT

An electronic transmission method, device and system, and computer readable storage medium are provided. The electronic transmission method includes: receiving a first instruction for a target electronic file; after receiving the first instruction, dispatching the target electronic file from a first storage location on which it is stored currently to a second storage location, the network connectivity between the second storage location and a target terminal being better than the network connectivity between the first storage location and the target terminal; after receiving a second instruction for the target electronic file, transmitting the target electronic file from the second storage location to the target terminal. This method ensures that it will not be difficult for the target terminal to acquire the target electronic file in time due to poor network connectivity, which in turn improves the online transaction efficiency of electronic files.

16 Claims, 9 Drawing Sheets

(58) Field of Classification Search
USPC .................................................. 705/26.81
See application file for complete search history.

(56) References Cited

U.S. PATENT DOCUMENTS

| | | | | |
|---|---|---|---|---|
| 10,225,365 | B1* | 3/2019 | Hotchkies | ........... H04L 67/2842 |
| 2007/0179854 | A1 | 8/2007 | Ziv et al. | |
| 2008/0167954 | A1* | 7/2008 | Kawakami | ......... G06Q 30/0254 |
| | | | | 705/14.52 |
| 2012/0016764 | A1* | 1/2012 | Ouimet | ............. G06Q 30/0633 |
| | | | | 705/26.7 |
| 2012/0303818 | A1* | 11/2012 | Thibeault | ................ H04L 67/10 |
| | | | | 709/226 |
| 2013/0326022 | A1* | 12/2013 | Ehrlich | ............... G06F 16/9574 |
| | | | | 709/219 |
| 2014/0074712 | A1* | 3/2014 | Palmer | .................. G06Q 30/06 |
| | | | | 705/44 |
| 2014/0089257 | A1* | 3/2014 | Ignacio | ................ G06F 16/214 |
| | | | | 707/609 |
| 2014/0281903 | A1* | 9/2014 | Le Chevalier | ...... G06F 16/3334 |
| | | | | 715/234 |
| 2015/0242291 | A1* | 8/2015 | Chang | ................. G06F 11/2023 |
| | | | | 714/6.3 |
| 2015/0363455 | A1* | 12/2015 | Bhattacharjee | ..... G06F 16/2343 |
| | | | | 711/103 |
| 2017/0264822 | A1 | 9/2017 | Shen et al. | |
| 2017/0353552 | A1* | 12/2017 | Ober | ................... G06F 16/1824 |

FOREIGN PATENT DOCUMENTS

| | | |
|---|---|---|
| CN | 105046502 A | 11/2015 |
| CN | 105653642 A | 6/2016 |

OTHER PUBLICATIONS

Chao, Yaxin; "Content Delivery Networks"; 2003; University of Ottawa (Year: 2003).*
TimesTen; "Mid-tier Caching"; 2002; SIGMOD '02 (Year: 2002).*
First office action of Chinese application No. 201810020195.4 dated May 12, 2020.

* cited by examiner

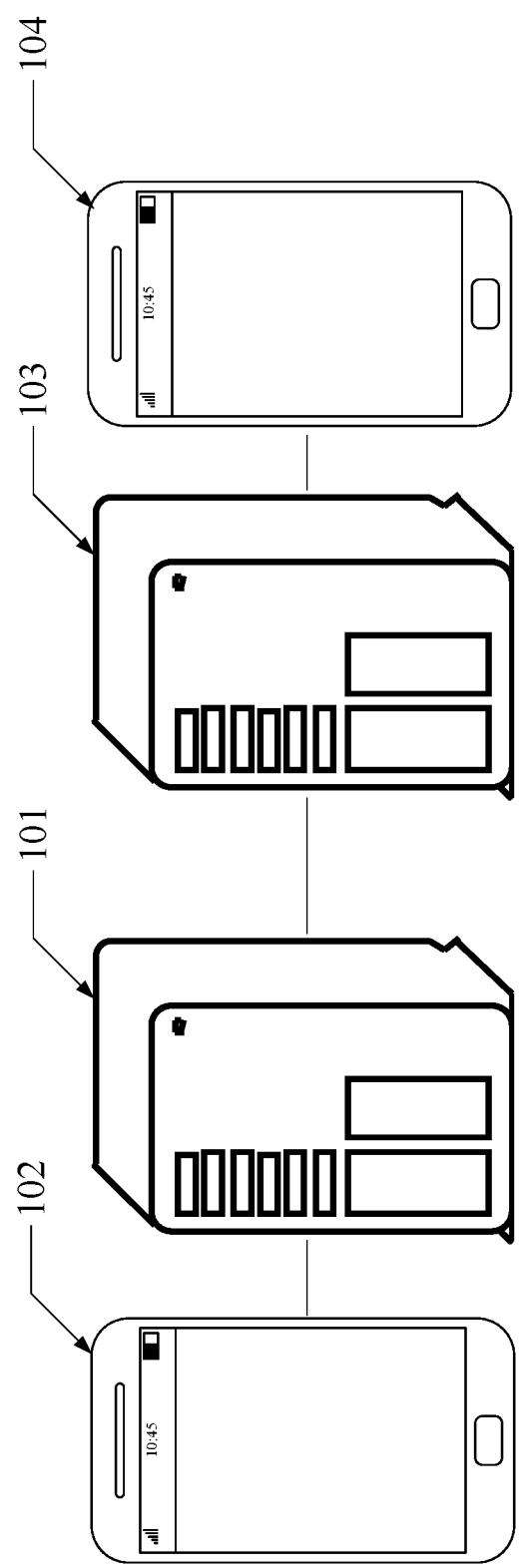

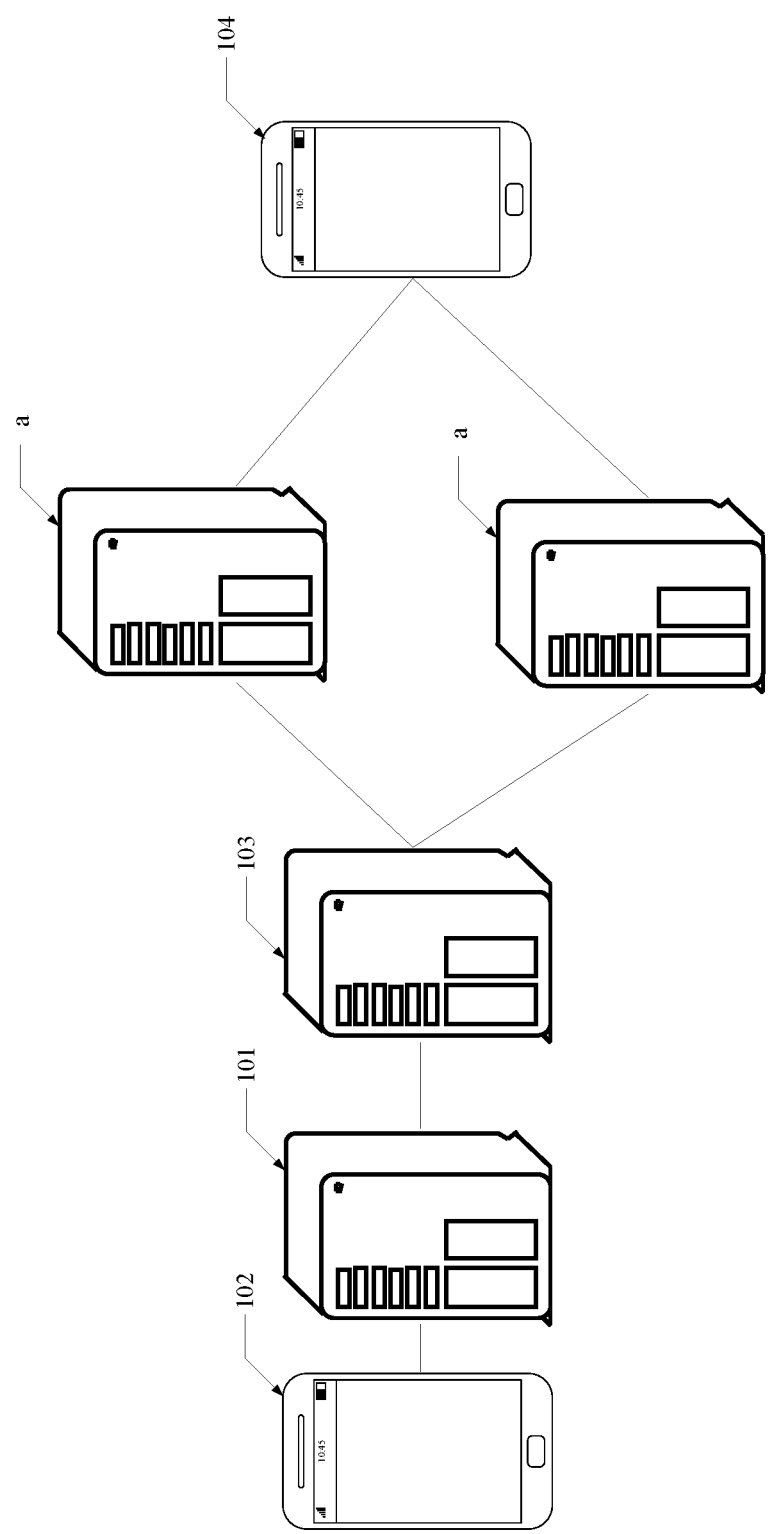

ELECTRONIC FILE TRANSMISSION METHOD, DEVICE, SYSTEM, AND COMPUTER READABLE STORAGE MEDIUM

This application claims priority to the Chinese Patent Application No. 201810020195.4, filed with the State Intellectual Property Office on Jan. 9, 2018 and titled "Electronic file transmission method, device and system, and computer readable storage medium", the entire contents of which are incorporated herein by reference.

TECHNICAL FIELD

The present disclosure relates to an electronic transmission method, device, system, and computer readable storage medium.

BACKGROUND

With the rapid development of the Internet industry, traditional ways of carrying and selling electronic files such as audio, video, images or text, etc. (hereinafter referred to as electronic files) on optical discs, tapes, picture frames or papers, etc. have been replaced by a way of selling electronic files online. The electronic files sold online do not require a carrier such as an optical disc, tape, picture frame or paper, etc., so that the unit price is low and the shopping flexibility is high.

SUMMARY

The present disclosure provides an electronic transmission method, device, system, and computer readable storage medium.

In a first aspect, there is provided an electronic transmission method, comprising:

receiving a first instruction for a target electronic file;

after receiving the first instruction, dispatching the target electronic file from a first storage location on which it is stored currently to a second storage location, the network connectivity between the second storage location and a target terminal being better than the network connectivity between the first storage location and the target terminal;

after receiving a second instruction for the target electronic file, transmitting the target electronic file from the second storage location to the target terminal.

Optionally, dispatching the target electronic file from a first storage location on which it is stored currently to a second storage location comprises:

transmitting the target electronic file from a source server to an edge server of a content delivery network.

Optionally, dispatching the target electronic file from a first storage location on which it is stored currently to a second storage location comprises:

transmitting an electronic file acquisition request to a third-party server, the electronic file acquisition request being used to instruct the third-party server to return the target electronic file; and receiving the target electronic file returned by the third-party server, and storing the target electronic file in a source server.

Optionally, an Internet Protocol (IP) address of the third-party server is an IP address that is restricted from being accessed, and transmitting an electronic file acquisition request to a third-party server comprises:

transmitting the electronic file acquisition request to the third-party server through a virtual private network; and receiving the target electronic file returned by the third-party server comprises:

receiving, by the virtual private network, the target electronic file returned by the third-party server.

Optionally, dispatching the target electronic file from a first storage location on which it is stored currently to a second storage location comprises:

obtaining an IP address of the target terminal;

determining, according to the IP address of the target terminal, a target server of which the network connectivity with the target terminal satisfies a first connectivity requirement among a plurality of distributed servers that is predetermined; and transmitting the target electronic file from a source server to the target server.

Optionally, determining, according to the IP address of the target terminal, a target server of which the network connectivity with the target terminal satisfies a first connectivity requirement among a plurality of distributed servers that is predetermined comprises:

determining, according to the IP address of the target terminal, an operator of the network where the target terminal is located and a geographical area where the target terminal is located; and determining the target server from the plurality of distributed servers, an operator of the network where the target server is located being the same as the operator of the network where the target terminal is located, and a geographical area where the target server is located being the same as the geographical area where the target terminal is located.

Optionally, the first instruction comprises a first target instruction and a second target instruction;

the first target instruction is one of the following instructions: an instruction to add the target electronic file to a shopping cart, an instruction to open a shopping page corresponding to the target electronic file, and an instruction to put the target electronic file into favorites; and the second target instruction is an instruction to generate a purchase order including the target electronic file.

Optionally, dispatching the target electronic file from a first storage location on which it is stored currently to a second storage location comprises:

when the first instruction is the first target instruction, dispatching the target electronic file from a first storage medium in the first storage location to a second storage medium, the access speed of the first storage medium being lower than that of the second storage medium; and when the first instruction is the second target instruction, dispatching the target electronic file from the second storage medium to the second storage location.

Optionally, the second storage medium is a solid state hard disk and the first storage medium is a mechanical hard disk or a magnetic tape.

Optionally, if the first instruction carries an identifier of a user, the target terminal is a terminal bound to the identifier of the user; and if an input terminal identifier is received, the target terminal is a terminal corresponding to the terminal identifier.

Optionally, dispatching the target electronic file from a first storage location on which it is stored currently to a second storage location comprises:

determining whether the network connectivity between the first storage location and the target terminal meets a second connectivity requirement; and dispatching the target electronic file from the first storage location on which it is stored currently to the second storage location when the network connectivity between the first storage location and the target terminal does not satisfy the second connectivity requirement.

Optionally, the second instruction is an instruction to pay for the target electronic file.

In a second aspect, there is provided an electronic file transmission device, comprising:

one or more processors; and a memory;

wherein the memory stores one or more programs configured to be executed by the one or more processors, and the one or more programs comprise instructions for performing the following operations:

receiving a first instruction for a target electronic file;

after receiving the first instruction, dispatching the target electronic file from a first storage location on which it is stored currently to a second storage location, the network connectivity between the second storage location and a target terminal being better than the network connectivity between the first storage location and the target terminal;

receiving a second instruction for the target electronic file, and after receiving the second instruction for the target electronic file, transmitting the target electronic file from the second storage location to the target terminal.

Optionally, the one or more programs comprise instructions for performing the following operations:

transmitting the target electronic file from a source server to an edge server of a content delivery network.

Optionally, the one or more programs comprise instructions for performing the following operations:

transmitting an electronic file acquisition request to a third-party server, the electronic file acquisition request being used to instruct the third-party server to return the target electronic file; and receiving the target electronic file returned by the third-party server, and storing the target electronic file in a source server.

Optionally, the one or more programs comprise instructions for performing the following operations:

obtaining an IP address of the target terminal;

determining, according to the IP address of the target terminal, a target server of which the network connectivity with the target terminal satisfies a first connectivity requirement among a plurality of distributed servers that is predetermined; and transmitting the target electronic file from a source server to the target server.

Optionally, the first instruction comprises a first target instruction and a second target instruction;

the first target instruction is one of the following instructions: an instruction to add the target electronic file to a shopping cart, an instruction to open a shopping page corresponding to the target electronic file, and an instruction to put the target electronic file into favorites; and the second target instruction is an instruction to generate a purchase order including the target electronic file.

Optionally, wherein the one or more programs comprise instructions for performing the following operations:

when the first instruction is the first target instruction, dispatching the target electronic file from a first storage medium in the first storage location to a second storage medium, the access speed of the first storage medium being lower than that of the second storage medium; and when the first instruction is the second target instruction, dispatching the target electronic file from the second storage medium to the second storage location.

Optionally, the one or more programs comprise instructions for performing the following operations:

determining whether the network connectivity between the first storage location and the target terminal meets a second connectivity requirement; and dispatching the target electronic file from the first storage location on which it is stored currently to the second storage location when the network connectivity between the first storage location and the target terminal does not satisfy the second connectivity requirement.

In a third aspect, there is provided an electronic file transmission system, comprising: an electronic file transmission device and a target terminal;

wherein the electronic file transmission device comprises:

one or more processors; and a memory;

wherein the memory stores one or more programs configured to be executed by the one or more processors, and the one or more programs comprise instructions for performing the following operations:

receiving a first instruction for a target electronic file;

after receiving the first instruction, dispatching the target electronic file from a first storage location on which it is stored currently to a second storage location, the network connectivity between the second storage location and a target terminal being better than the network connectivity between the first storage location and the target terminal;

receiving a second instruction for the target electronic file, and after receiving the second instruction for the target electronic file, transmitting the target electronic file from the second storage location to the target terminal.

In a fourth aspect, there is provided a computer readable storage medium having stored thereon instructions, when the instructions are executed on a processing component of a computer, the processing component performs any one of the electronic file transmission methods in the first aspect.

BRIEF DESCRIPTION OF THE DRAWINGS

FIG. 1-1 is a schematic diagram of an implementation environment according to an embodiment of the present disclosure;

FIG. 1-2 is a schematic diagram of another implementation environment according to an embodiment of the present disclosure;

FIG. 1-3 is a schematic diagram of yet another implementation environment according to an embodiment of the present disclosure;

FIG. 1-4 is a schematic diagram of still yet another implementation environment according to an embodiment of the present disclosure;

FIG. 2 is a flow chart of an electronic file transmission method according to an embodiment of the present disclosure;

FIG. 3 is a flow chart of another electronic file transmission method according to an embodiment of the present disclosure;

FIG. 4 is a block diagram of an electronic file transmission device according to an embodiment of the present disclosure;

DETAILED DESCRIPTION

Figures 1, 2:
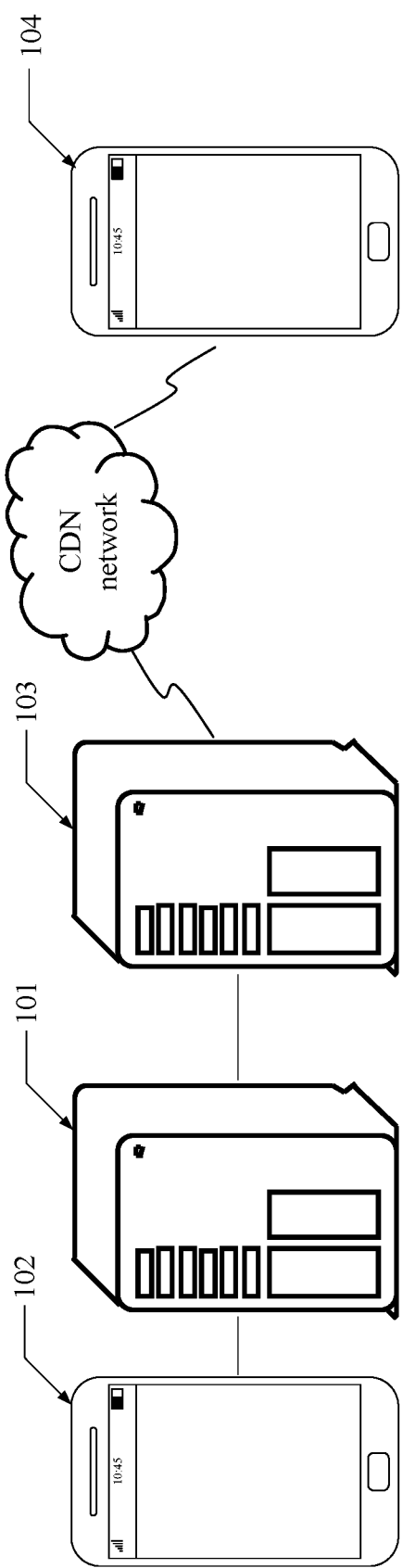

In order to make the principles and advantages of the present disclosure more apparent, the embodiment of the present disclosure will be further described in detail below.

Currently, the way to purchase electronic files online has become more and more common in people's daily lives. Electronic files purchased online may be audio files, video files, images or e-books, etc.

Generally, when purchasing an electronic file online, a user may open an electronic file shopping platform in a shopping terminal. The shopping terminal may be a mobile phone, a tablet computer or a desktop computer. After the electronic file shopping platform is opened, the user may browse the text description and picture introduction of the electronic files on the electronic file shopping platform. During the browsing process, when the user finds the electronic file that he wants to purchase, the electronic file can be added to a shopping cart, and then the electronic file is selected in the shopping cart to generate a purchase order, or the user may directly select the electronic file to generate a purchase order without adding the electronic file to the shopping cart. When the user pays for the electronic file based on the purchase order, the user successfully purchases the electronic file. The shopping terminal may transmit a file push instruction to a background server after the user successfully purchases the electronic file. After receiving the file push instruction, the background server may control a source server to push the electronic file stored in the source server to a target terminal. The source server is a storage server provided by a merchant that sells the electronic file on the electronic file shopping platform. The target terminal is a terminal to which the user needs to push the electronic file. The target terminal may be a mobile phone, a tablet computer or an e-book reader and other terminal equipment.

In an embodiment of the present disclosure, the target terminal and the shopping terminal described above may be the same terminal, or may be different terminals. For example, the user may purchase an e-book A in his own mobile phone (shopping terminal) and instruct the background server to push the e-book A to the user's tablet computer (target terminal). In this case, the shopping terminal and the target terminal are different terminals. Or the user may purchase an e-book B in his own mobile phone (shopping terminal) and instruct the background server to push the e-book B to the mobile phone (target terminal). In this case, the shopping terminal and the target terminal are the same terminal.

In practical applications, due to the complexity of the network environment, there is often a case where the network connectivity between the source server and the target terminal is poor. Network connectivity can reflect the quality of communication between two devices in the network. In general, the network connectivity between two devices can be characterized by the delay of the response of one of the two devices to the ping (Packet Internet Groper) command issued by the other device. The smaller the delay, the better the network connectivity between the two devices. For example, when characterizing the network connectivity between device A and device B, device A may transmit a data packet to device B by using the ping command. In response, device B may transmit a data packet of the same size to device A after receiving the data packet. The network connectivity between device A and device B may be characterized by the time difference between the time when device A receives the data packet and the time when device A transmits the data packet. In the case where the network connectivity between the source server and the target terminal is poor, it is difficult for the source server to push the electronic file to the target terminal in time, which results in low online transaction efficiency of electronic files.

An embodiment of the present disclosure provides an electronic file transmission method, which may improve the online transaction efficiency of electronic files. In the electronic file transmission method, after receiving a first instruction for a target electronic file, a background server may dispatch the target electronic file to a second storage location with better network connectivity with the target terminal, and transmit the target electronic file to the target terminal from the second storage location after receiving a second instruction for the target electronic file, so that the target electronic file is dispatched to the second storage location before a user pays, that is, before triggering the second instruction. Then after the user pays, that is, after triggering the second instruction, the target electronic file may be directly transmitted from the second storage location to the target terminal, thereby ensuring that it will not be difficult for the target terminal to acquire the target electronic file in time because of poor network connectivity, which in turn improves the online transaction efficiency of electronic files.

FIG. 1-1 is a schematic diagram of an implementation environment involved in an electronic file transmission method according to an embodiment of the present disclosure. As shown in FIG. 1-1, the implementation environment may include a background server 101, a shopping terminal 102, a source server 103, and a target terminal 104. The background server 101 may be in wired or wireless communication with the shopping terminal 102 and the source server 103, respectively. The source server 103 and the target terminal 104 may communicate by wire or wirelessly. It should be noted that the background server 101 and the source server 103 may be the same server or different servers, and the shopping terminal 102 and the target terminal 104 may be the same terminal or different terminals.

As shown in FIG. 1-2, in a case of the embodiment of the present disclosure, the implementation environment may further include a CDN (Content Delivery Network) network. The source server 103 and the target terminal 104 may communicate through the CDN network. In the process in which the source server 103 pushes the electronic file to the target terminal 104, the source server 103 can first push the electronic file to the CDN network, and then the CDN network pushes the electronic file to the target terminal 104.

Figures 1, 2, 3:
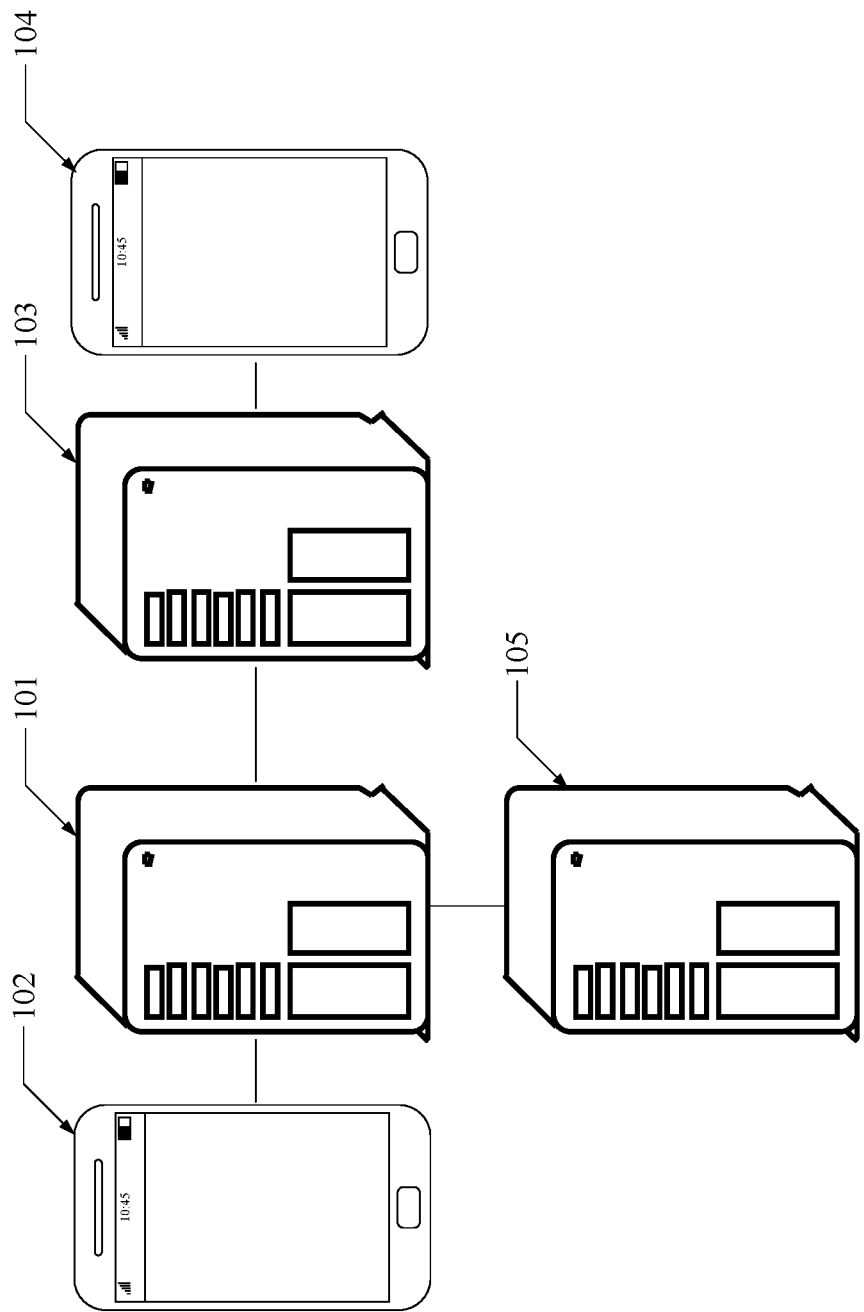
Figure 2:
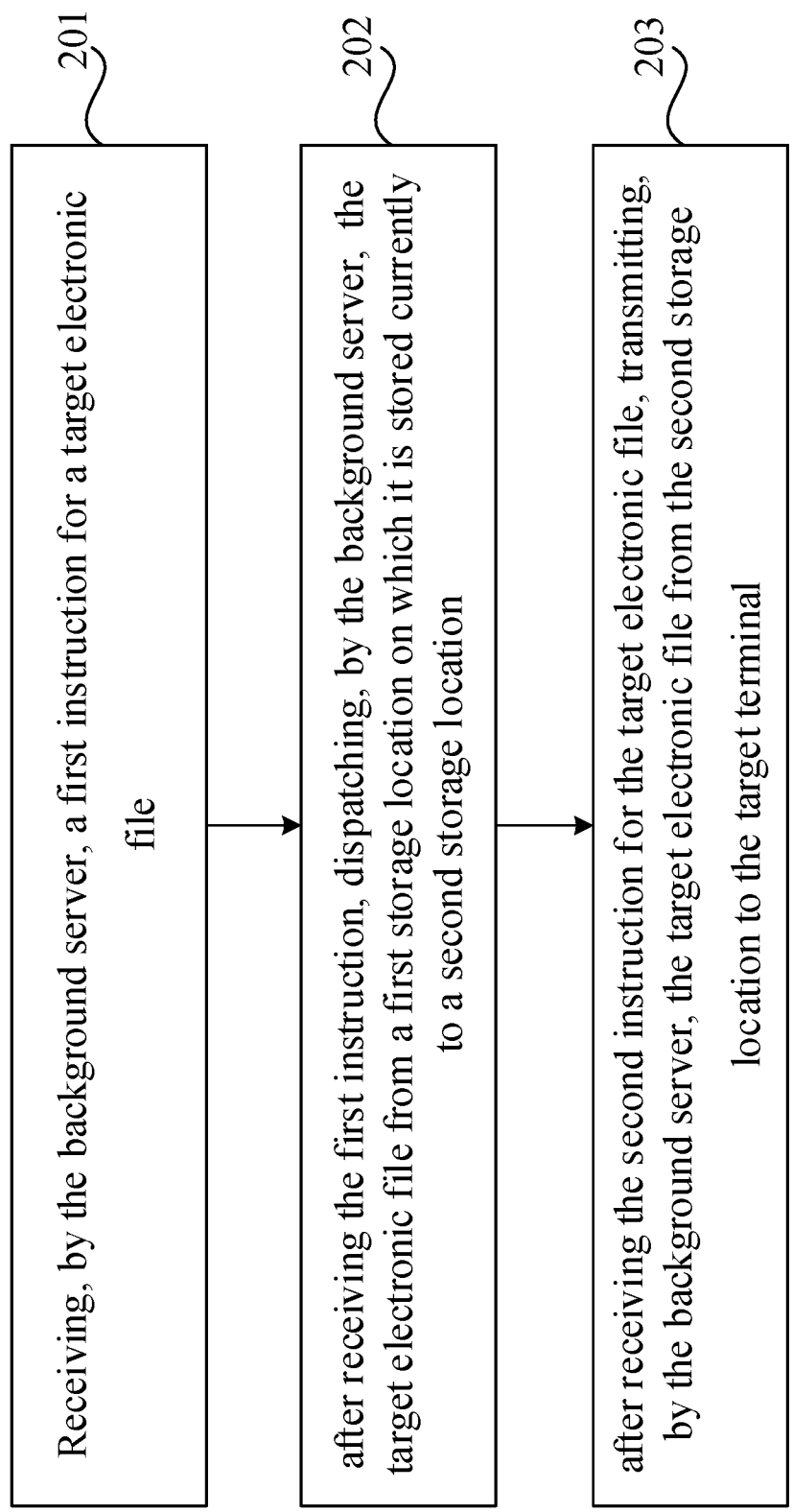
Figure 3:
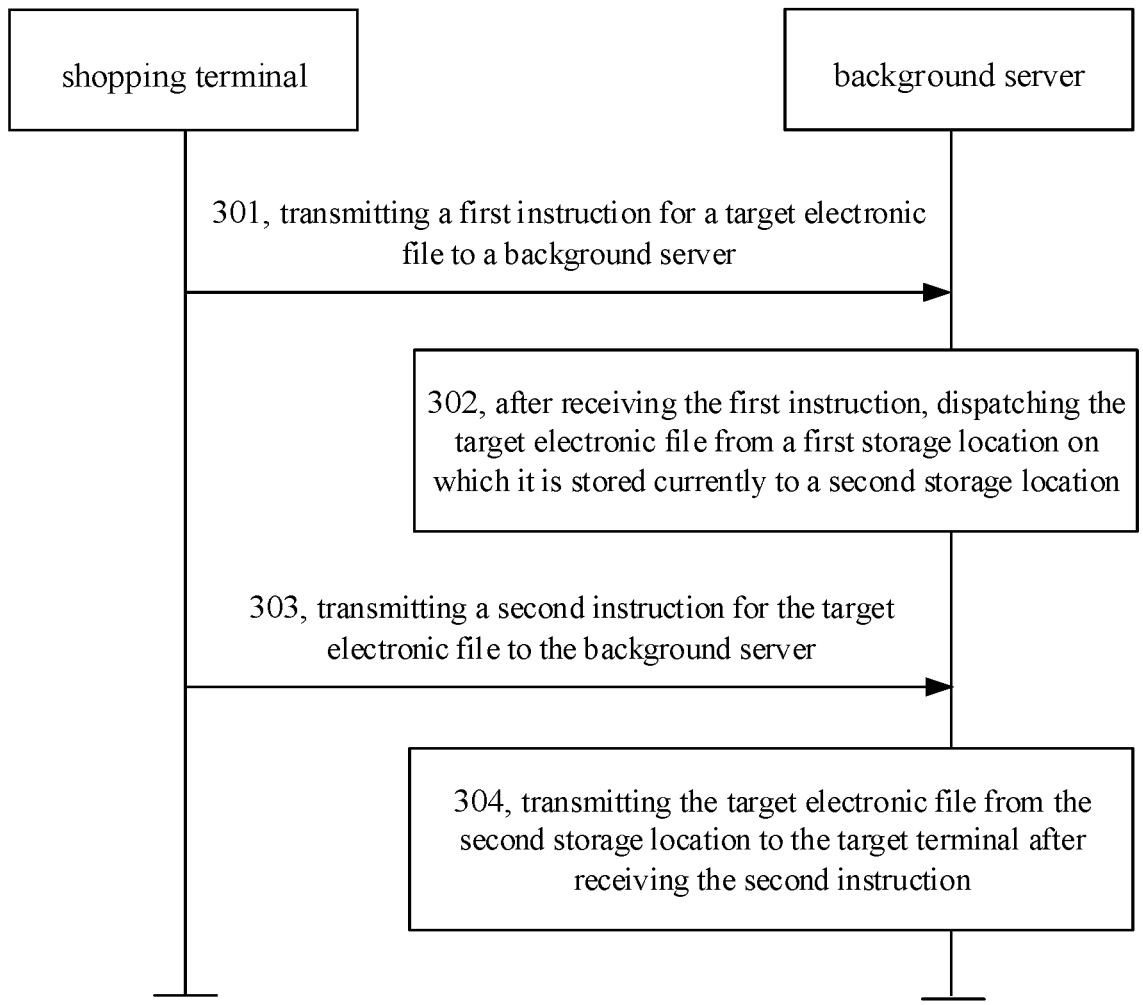

As shown in FIG. 1-3, in another case of the embodiment of the present disclosure, the implementation environment may further include a third-party server 105. The third-party server 105 may communicate with the background server 101 by wire or wirelessly. The third-party server 105 may be a storage server provided by a third party that owns the copyright of an electronic file. When a merchant selling the electronic file does not own the copyright of the electronic file, the background server 101 needs to request the third-party server 105 to acquire the electronic file to push the electronic file to the target terminal 104.

As shown in FIG. 1-4, in yet another case of the embodiment of the present disclosure, the implementation environment may further include a plurality of servers a distributed by the merchant (only two servers a are shown in FIG. 1-4).

Each server a may communicate with the source server 103 and the target terminal 104 by wire or wirelessly.

FIG. 2 is a flow chart of an electronic file transmission method according to an embodiment of the present disclosure. The electronic file transmission method may be applied to the background server 101 shown in FIG. 1-1, FIG. 1-2, FIG. 1-3 or FIG. 1-4. As shown in FIG. 2, the electronic file transmission method includes following operating processes.

In step 201, the background server receives a first instruction for a target electronic file.

In step 202, after receiving the first instruction, the background server dispatches the target electronic file from a first storage location on which it is stored currently to a second storage location, and the network connectivity between the second storage location and a target terminal is better than the network connectivity between the first storage location and the target terminal.

In step 203, after receiving the second instruction for the target electronic file, the background server transmits the target electronic file from the second storage location to the target terminal.

In summary, in the electronic file transmission method provided by the embodiment of the present disclosure, after a first instruction for a target electronic file is received, the target electronic file is dispatched to a second storage location with better network connectivity with a target terminal. After a second instruction for the target electronic file is received, the target electronic file is transmitted to the target terminal from the second storage location, so that the target electronic file has already been dispatched to the second storage location before the user pays, that is, before triggering the second instruction. Thus after the user pays, that is, after triggering the second instruction, the target electronic file may be directly transmitted from the second storage location to the target terminal, thereby ensuring that it will not be difficult for the target terminal to acquire the target electronic file in time due to poor network connectivity, which in turn improves the online transaction efficiency of electronic files.

FIG. 3 is a flowchart of an electronic file transmission method according to an embodiment of the present disclosure. The electronic file transmission method may be applied to the implementation environments shown in FIG. 1-1, 1-2, 1-3 or 1-4. As shown in FIG. 3, the electronic file transmission method includes the following working processes.

In step 301, a shopping terminal transmits a first instruction for a target electronic file to a background server.

It should be noted that the first instruction may include a first target instruction and a second target instruction. The first target instruction may be an instruction to add the target electronic file to a shopping cart, an instruction to open a shopping page corresponding to the target electronic file, or an instruction to put the target electronic file into favorites. The shopping terminal may transmit the first target instruction to the background server after executing the operation of adding the target electronic file to the shopping cart, opening the shopping page corresponding to the target electronic file, or putting the target electronic file into favorites. The second target instruction may be an instruction to generate a purchase order including the target electronic file. The shopping terminal may transmit the second target instruction to the background server after generating the purchase order including the target electronic file.

In step 302, after receiving the first instruction, the background server dispatches the target electronic file from a first storage location on which it is stored currently to a second storage location.

The background server receiving the first instruction indicates that the shopping terminal performs the operation of adding the target electronic file to the shopping cart, the operation of opening the shopping page corresponding to the target electronic file, the operation of putting the target electronic file into favorites, or the operation of generating a purchase order including the target electronic file. In this case, a user is likely to pay for the target electronic file in the subsequent process to purchase the target electronic file. After the user purchases the target electronic file, the background server needs to push the target electronic file to the target terminal.

In some possible cases, the network connectivity between the first storage location where the target electronic file is currently located and the target terminal is poor. Thus after the user successfully purchases the target electronic file, if the background server pushes the target electronic file to the target terminal directly from the first storage location, the target terminal may not be able to acquire the pushed target electronic file in time. In order to avoid this from happening, in an embodiment of the present disclosure, the background server may dispatch the target electronic file from the first storage location to the second storage location after receiving the first instruction. The network connectivity between the second storage location and the target terminal is better than that between the first storage location and the target terminal. In this way, after the user purchases the target electronic file, the background server may push the target electronic file from the second storage location to the target terminal. Since the network connectivity between the second storage location and the target terminal is superior, the target terminal is more likely to acquire the target electronic file in time than the first storage location, thereby improving the online transaction efficiency of electronic files.

Depending on the difference between the first storage location and the second storage location, an embodiment of the present disclosure provides the following three alternative ways of dispatching the target electronic file from the first storage location to the second storage location:

In the first way, that is, in the implementation environment shown in FIG. 1-2, the background server may dispatch the target electronic file from a source server (first storage location) to an edge server of the CDN network (the second storage location).

Since the CDN network may avoid the bottlenecks and links in the Internet that may affect the speed and stability of data transmission, and the CDN network has multi-exit characteristics so that the data transmission is faster and more stable, the network connectivity between the CDN network and the target terminal is usually better as compared with the source server. Therefore, in the first way, when the first storage location is the source server, the edge server of the CDN network may serve as the second storage location. The background server may transmit the target electronic file from the source server to the edge server of the CDN network after receiving the first instruction.

It should be noted that the embodiment of the present disclosure does not pre-push all the electronic files in the source server to the CDN network, but only after receiving the first instruction for an electronic file (for example, the target electronic file), pushes the electronic file (e.g., the target electronic file) to the CDN network. Therefore, the embodiment of the present disclosure can reasonably utilize the storage resources of the CDN network according to the behavior of the user, so that some electronic files with lower purchase frequency may be avoided to occupy the storage resources of the CDN network, thereby achieving a cost-saving effect (the storage resources of the CDN network usually need to be paid for), and also improving the utilization efficiency of the storage resources of the CDN network.

Optionally, the technical process of the background server transmitting the target electronic file from the source server to the edge server of the CDN network may be: the background server transmits a CDN dispatching instruction for the target electronic file to the source server, and the source server transmits the target electronic file to at least one edge server of the CDN network after receiving the CDN dispatching instruction. It should be noted that when the source server and the background server are the same server, the background server may not execute the technical process of transmitting the CDN dispatching instruction, but directly transmit the target electronic file stored therein to the at least one edge server of the CDN network.

In the second way, that is, in the implementation environment shown in FIG. 1-4, the background server may acquire an IP (Internet Protocol) address of the target terminal, and determine, according to the IP address, a target server (the second storage location) of which the network connectivity with the target terminal satisfies a first connectivity requirement among a plurality of servers deployed in a distributed mode by a merchant. Then the background server may transmit the target electronic file from the source server (the first storage location) to the target server. The plurality of servers distributed by the merchant refers to a plurality of servers deployed in a distributed mode by the merchant who sells the target electronic file in different geographical locations.

In an embodiment of the present disclosure, the plurality of servers deployed in a distributed mode by the merchant may not store all the electronic files sold by the merchant, but receive a target electronic file transmitted by the source server only when the network connectivity with the target terminal is good and forward the target electronic file to the target terminal. This results in lower storage performance requirements for distributed servers, which may save the cost of deploying servers for merchants.

In an embodiment of the present disclosure, the technical process of the background server determining a target server in a plurality of servers deployed in a distributed mode by a merchant according to the IP address of the target terminal may be: the background server determines an operator of the network where the target terminal is located and a geographical area where the target terminal is located according to the IP address of the target terminal, and then the background server determines, among the plurality of servers deployed in a distributed mode by the merchant, a target server of which an operator of the network where it is located is the same as the operator of the network where the target terminal is located and a geographical area where it is located is the same as the geographical area where the target terminal is located. For example, the IP address of the target terminal acquired by the background server is 1.80.0.57. The background server may determine, according to the IP address, the operator of the network where the target terminal is located as a telecom operator and determine that the geographical area where the target terminal is located is Shaanxi Province. Then the background server may determine, among the plurality of servers deployed in a distributed mode by the merchant, a target server of which an operator of the network where it is located is a telecom operator and a geographical area where it is located is Shaanxi Province.

Since the operator of the network where the target server is located is the same as the operator of the network where the target terminal is located, and the geographical area where the target server is located is the same as the geographical area where the target terminal is located, the network connectivity between the target server and the target terminal is usually better than that between the source server and the target terminal. Therefore, in the second way, when the first storage location is the source server, the target server may serve as the second storage location. The background server may determine a target server from the plurality of servers deployed in a distributed mode by the merchant after receiving the first instruction, and transmit the target electronic file from the source server to the target server.

Optionally, the technical process of the background server transmitting the target electronic file from the source server to the target server may be: the background server transmits a server dispatching instruction for the target electronic file to the source server, the server dispatching instruction may carry the IP address of the target server, and after receiving the server dispatching instruction, the source server transmits the target electronic file to the target server according to the IP address of the target server. It should be noted that when the source server and the background server are the same server, the background server may not execute the technical process of transmitting the server dispatching instruction, but directly transmit the target electronic file stored therein to the target server.

In the third way, that is, in the implementation environment shown in FIG. 1-3, the background server may transmit an electronic file acquisition request to a third-party server (the first storage location). The third-party server may return the target electronic file after receiving the electronic file acquisition request. The background server may receive the target electronic file returned by the third-party server and store the target electronic file in the source server (the second storage location).

In some possible cases, the merchant selling the target electronic file may not own the copyright of the target electronic file. At this time, the server (that is, the source server) provided by the merchant is not allowed to store the target electronic file. After the user purchases the target electronic file, the background server needs to request a storage server (that is, the third-party server) provided by a third party who owns the copyright of the target electronic file to push the target electronic file to the target terminal. Since it is difficult for the merchant to control the quality of service of the third-party server, and even in some cases, the third-party server may be set up outside the country, that is, the IP address of the third-party server is an IP address that is restricted from being accessed, it is generally possible to speculate that the network connectivity between the third-party server and the target terminal is poor. Therefore, if the target electronic file is directly pushed by the third-party server, the target terminal may not be able to acquire the target electronic file in time. Hence, in the third way, when the first storage location is the third-party server, the second storage location may be the source server. The background server may request the target electronic file from the third-party server after receiving the first instruction, and store the requested target electronic file in the source server.

Of course, the third way may be combined with the first way, or the third way may be combined with the second way when needed. That is, after storing the target electronic file acquired by the request in the source server, the background server may transmit the target electronic file from the source server to the edge server of the CDN network or transmit same to the target server.

As mentioned above, the third-party server may be set up outside the country. In this case, the background server may communicate with the third-party server through a VPN (Virtual Private Network). That is, the background server may transmit the electronic file acquisition request to the third-party server through the VPN network, and may also receive the target electronic file returned by the third-party server through the VPN network.

When receiving a plurality of first instructions for different electronic files, the background server may dispatch the different electronic files from the first storage location to the second storage location in the order in which the first instructions are received. In other words, the dispatching behavior of the order placed first is prioritized over the dispatching behavior of the order placed later. The background server may preferentially dispatch the electronic file corresponding to the order placed first to the second storage location.

Usually, when the user only adds the target electronic file to the shopping cart, or the user only opens the shopping page corresponding to the target electronic file, or the user only puts the target electronic file into favorites, it is possible that the user will not pay for the target electronic file in the subsequent processes. In this case, the background server dispatching the target electronic file to the second storage location may waste the storage resources of the second storage location. Therefore, in an embodiment of the present disclosure, when the first instruction received by the background server is an instruction to add the target electronic file to the shopping cart, an instruction to open the shopping page corresponding to the target electronic file, or an instruction putting the target electronic file into favorites, that is, when the background server receives the first target instruction, the background server may not dispatch the target electronic file from the first storage location to the second storage location, but dispatch the target electronic file from a first storage medium in the first storage location to a second storage medium. Here, the access speed of the first storage medium (which may also be referred to as read/write speed) is lower than that of the second storage medium. That is, the background server may dispatch the target electronic file from cold storage to hot storage after receiving the first instruction. For example, the second storage medium may be a solid state hard disk, and the first storage medium may be a mechanical hard disk or a tape.

When the background server receives the first instruction to generate a purchase order, that is, when the background server receives the second target instruction, it may be determined that the user is very likely to pay for the target electronic file. In this case, the background server may dispatch the target electronic file from the second storage medium of the first storage location to the second storage location. Since the access speed of the second storage medium is high, the speed of the background server dispatching the target electronic file from the first storage location to the second storage location is also fast, thereby ensuring that the target terminal acquires the target electronic file fast.

Of course, in some possible cases, the second storage location may have stored the target electronic file. At this time, the background server may not perform the technical process of dispatching the target electronic file from the first storage location on which it is stored currently to the second storage location. Optionally, the background server may store historical dispatching records. After receiving the first instruction, the background server may query the historical dispatching record to determine whether the target electronic file has been dispatched to the second storage location. If the query result shows that the background server has dispatched the target electronic file to the second storage location, then the background server may not perform the technical process of dispatching the target electronic file from the first storage location on which it is stored currently to the second storage location.

In addition, in some possible cases, the network connectivity between the first storage location and the target terminal may be good. In this case, the background server may also not perform the technical process of dispatching the target electronic file from the first storage location on which it is stored currently to the second storage location. Optionally, after receiving the first instruction transmitted by the shopping terminal, the background server may determine whether the network connectivity between the first storage location and the target terminal meets a second connectivity requirement. When the network connectivity between the first storage location and the target terminal does not satisfy the second connectivity requirement, the background server may dispatch the target electronic file from the first storage location on which it is stored currently to the second storage location. When the network connectivity of the first storage location to the target terminal satisfies the second connectivity requirement, the background server may not perform the technical process of dispatching the target electronic file from the first storage location on which it is stored currently to the second storage location.

In a possible implementation, the technical process of the background server determining whether the network connectivity between the first storage location and the target terminal meets the second connectivity requirement may be: the background server transmits a connectivity test instruction to the first storage location, the first storage location acquires a delay of the ping command response of the target terminal to the first storage location after receiving the connectivity test command. Then, the background server or the first storage location determines whether the delay is greater than a predetermined delay threshold. When the delay is greater than the predetermined delay threshold, the background server may determine that the network connectivity between the first storage location and the target terminal does not satisfy the second connectivity requirement. When the delay is not greater than the predetermined delay threshold, the background server may determine that the network connectivity between the first storage location and the target terminal satisfies the second connectivity requirement. Certainly, when the first storage location is the source server and the background server and the source server are the same server, the background server may not perform the technical process of transmitting the connectivity test command, but directly acquire a delay of the ping command response of the target terminal to the background server and determine whether the network connectivity between the first storage location (i.e., the background server) and the target terminal satisfies the second connectivity requirement based on the delay.

In step 303, the shopping terminal transmits a second instruction for the target electronic file to the background server.

The second instruction may be an instruction to pay for the target electronic file, and the shopping terminal may transmit the second instruction to the background server after the user pays for the target electronic file.

In step 304, the background server transmits the target electronic file from the second storage location to the target terminal after receiving the second instruction.

Optionally, the background server may transmit a push instruction to the second storage location after receiving the second instruction. The push command may carry the IP address of the target terminal. After receiving the push command, the second storage location may push the target electronic file to the target terminal according to the IP address of the target terminal.

In the following, the embodiment of the present application will briefly describe three ways for the background server to acquire the IP address of the target terminal.

In the first way, the first instruction transmitted by the shopping terminal to the background server may carry the identifier of the user. The background server may query the IP address of the target terminal according to the identifier of the user.

Optionally, the user may log in to the electronic file shopping platform based on the account information thereof in the shopping terminal, and after logging in to the electronic file platform, trigger the shopping terminal to transmit a first instruction to the background server. The first instruction may carry the account information of the user. The account information is the identifier of the user. The background server may determine a terminal pre-bound with the account information according to the account information of the user, and determine the terminal as the target terminal. Then the background server may acquire the IP address of the target terminal.

In some cases, the shopping terminal belongs to the user and the user wants to view the purchased electronic file in the shopping terminal, then the user may bind the account information of the user to the shopping terminal in advance. At this time, the target terminal determined by the background server is the shopping terminal. In other cases, the shopping terminal may not belong to the user or the user wants to view the purchased electronic file at the other terminal owned by the user, the user may pre-bind the account information of the user with the other terminal. At this time, the target terminal determined by the background server is the other terminal.

In the second way, the background server may receive the terminal identifier input by the user and transmitted by the shopping terminal, and acquire the IP address of the target terminal according to the terminal identifier.

Optionally, after triggering the shopping terminal to transmit the first instruction to the background server, the user may input in the shopping terminal the terminal identifier of the terminal (that is, the target terminal) on which the user wants to view the target electronic file. The shopping terminal may transmit the terminal identifier to the background server, so that the background server acquires the IP address of the target terminal according to the terminal identifier.

In the third way, after receiving the first instruction transmitted by the shopping terminal, the background server may directly determine the shopping terminal as the target terminal, and acquire the IP address of the shopping terminal as the IP address of the target terminal.

In summary, in the electronic file transmission way provided by the embodiment of the present disclosure, after a first instruction for a target electronic file is received, the target electronic file is dispatched to a second storage location with better network connectivity with a target terminal. After a second instruction for the target electronic file is received, the target electronic file is transmitted to the target terminal from the second storage location, so that the target electronic file has already been dispatched to the second storage location before the user pays, that is, before triggering the second instruction. Thus after the user pays, that is, after triggering the second instruction, the target electronic file may be directly transmitted from the second storage location to the target terminal, thereby ensuring that it will not be difficult for the target terminal to acquire the target electronic file in time due to poor network connectivity, which in turn improves the online transaction efficiency of electronic files.

Figure 4:
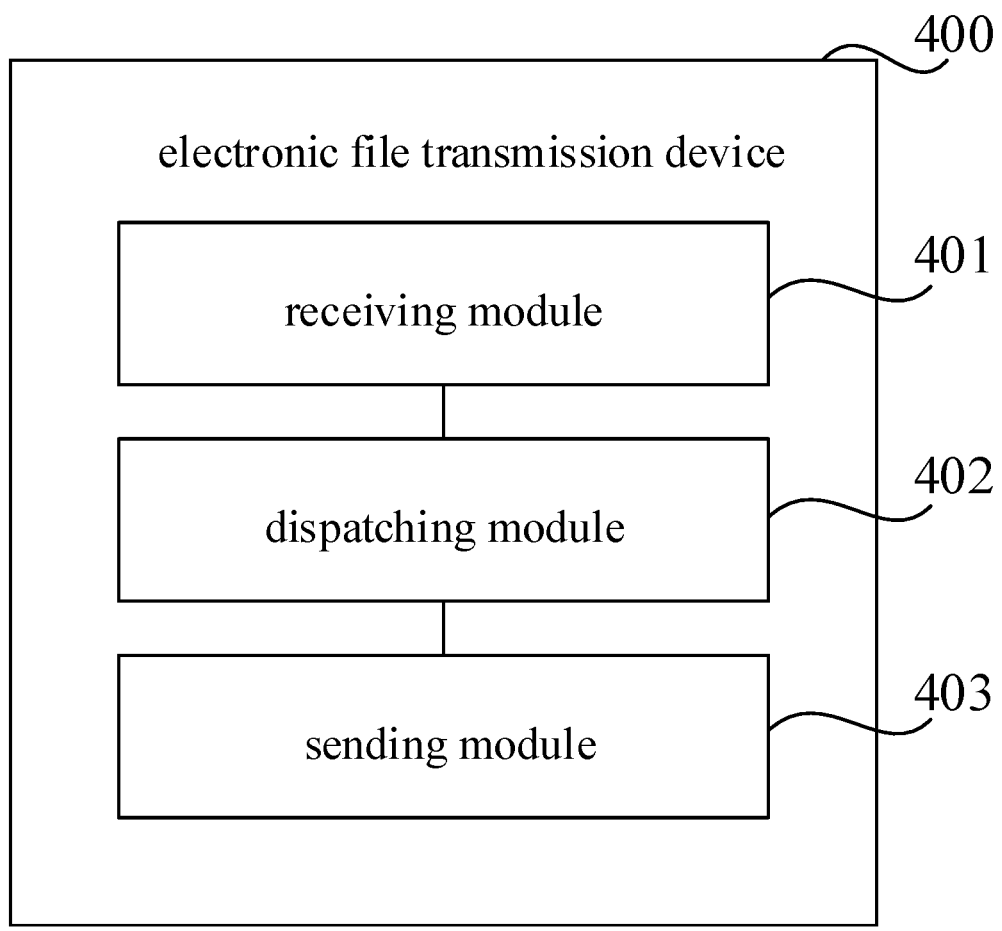

FIG. 4 is a block diagram of an electronic file transmission device 400 according to an embodiment of the present disclosure. As shown in FIG. 4, the electronic file transmission device 400 includes: a receiving module 401, a dispatching module 402, and a sending module 403. The receiving module 401 is configured to receive a first instruction for a target electronic file. The dispatching module 402 is configured to, after receiving the first instruction, dispatch the target electronic file from a first storage location on which it is stored currently to a second storage location, the network connectivity between the second storage location and a target terminal being better than the network connectivity between the first storage location and the target terminal. The sending module 403 is configured to, after receiving a second instruction for the target electronic file, transmit the target electronic file from the second storage location to the target terminal.

In an embodiment of the present disclosure, the dispatching module 402 is configured to transmit the target electronic file from a source server to an edge server of a content delivery network.

In an embodiment of the present disclosure, the dispatching module 402 is configured to transmit an electronic file acquisition request to a third-party server, the electronic file acquisition request being used to instruct the third-party server to return the target electronic file; and receive the target electronic file returned by the third-party server, and storing the target electronic file in a source server.

In an embodiment of the present disclosure, an Internet Protocol (IP) address of the third-party server is an IP address that is restricted from being accessed, and the dispatching module 402 is configured to transmit the electronic file acquisition request to the third-party server through a virtual private network, and receiving the target electronic file returned by the third-party server comprises: receiving, by the virtual private network, the target electronic file returned by the third-party server.

In an embodiment of the present disclosure, the dispatching module 402 is configured to obtain an IP address of the target terminal; determine, according to the IP address of the target terminal, a target server of which the network connectivity with the target terminal satisfies a first connectivity requirement among a plurality of distributed servers that is predetermined; and transmit the target electronic file from a source server to the target server.

In an embodiment of the present disclosure, the dispatching module 402 is configured to determine, according to the IP address of the target terminal, an operator of the network where the target terminal is located and a geographical area where the target terminal is located; and determine the target server from the plurality of distributed servers, an operator of the network where the target server is located being the same as the operator of the network where the target terminal is located, and a geographical area where the target server is located being the same as the geographical area where the target terminal is located.

In an embodiment of the present disclosure, the first instruction comprises a first target instruction and a second target instruction. The first target instruction is an instruction to add the target electronic file to a shopping cart, an instruction to open a shopping page corresponding to the target electronic file, or an instruction to put the target electronic file into favorites. The second target instruction is an instruction to generate a purchase order including the target electronic file.

In an embodiment of the present disclosure, the dispatching module 402 is configured to when the first instruction is the first target instruction, dispatch the target electronic file from a first storage medium in the first storage location to a second storage medium, the access speed of the first storage medium being lower than that of the second storage medium; and when the first instruction is the second target instruction, dispatch the target electronic file from the second storage medium to the second storage location.

In an embodiment of the present disclosure, the second storage medium is a solid state hard disk and the first storage medium is a mechanical hard disk or a magnetic tape.

In an embodiment of the present disclosure, the first instruction carries an identifier of a user, and the target terminal is a terminal bound to the identifier of the user; or an input terminal identifier is received, and the target terminal is a terminal corresponding to the terminal identifier.

In an embodiment of the present disclosure, the dispatching module 402 is configured to determine whether the network connectivity between the first storage location and the target terminal meets a second connectivity requirement; and dispatch the target electronic file from the first storage location on which it is stored currently to the second storage location when the network connectivity between the first storage location and the target terminal does not satisfy the second connectivity requirement.

In an embodiment of the present disclosure, the second target instruction is an instruction to pay for the target electronic file.

In summary, according to the electronic file transmission device provided by the embodiment of the present disclosure, after a first instruction for a target electronic file is received, the target electronic file is dispatched to a second storage location with better network connectivity with a target terminal. After a second instruction for the target electronic file is received, the target electronic file is transmitted to the target terminal from the second storage location, so that the target electronic file has already been dispatched to the second storage location before the user pays, that is, before triggering the second instruction. Thus after the user pays, that is, after triggering the second instruction, the target electronic file may be directly transmitted from the second storage location to the target terminal, thereby ensuring that it will not be difficult for the target terminal to acquire the target electronic file in time due to poor network connectivity, which in turn improves the online transaction efficiency of electronic files.

It should be noted that the electronic file transmission device provided by the above embodiment is exemplified only by the above division of the respective functional modules when the electronic file transmission device transmits electronic files. In practice, the above-described functions may be assigned and completed by different functional modules in accordance with requirements, that is the internal structure of the device can be divided into different functional modules to complete all or part of the functions described above. In addition, the electronic file transmission device and the electronic file transmission method provided in the above embodiments belong to the same concept, and the specific implementation process thereof can refer to the method embodiment and may not be described again hereto.

Figure 5:
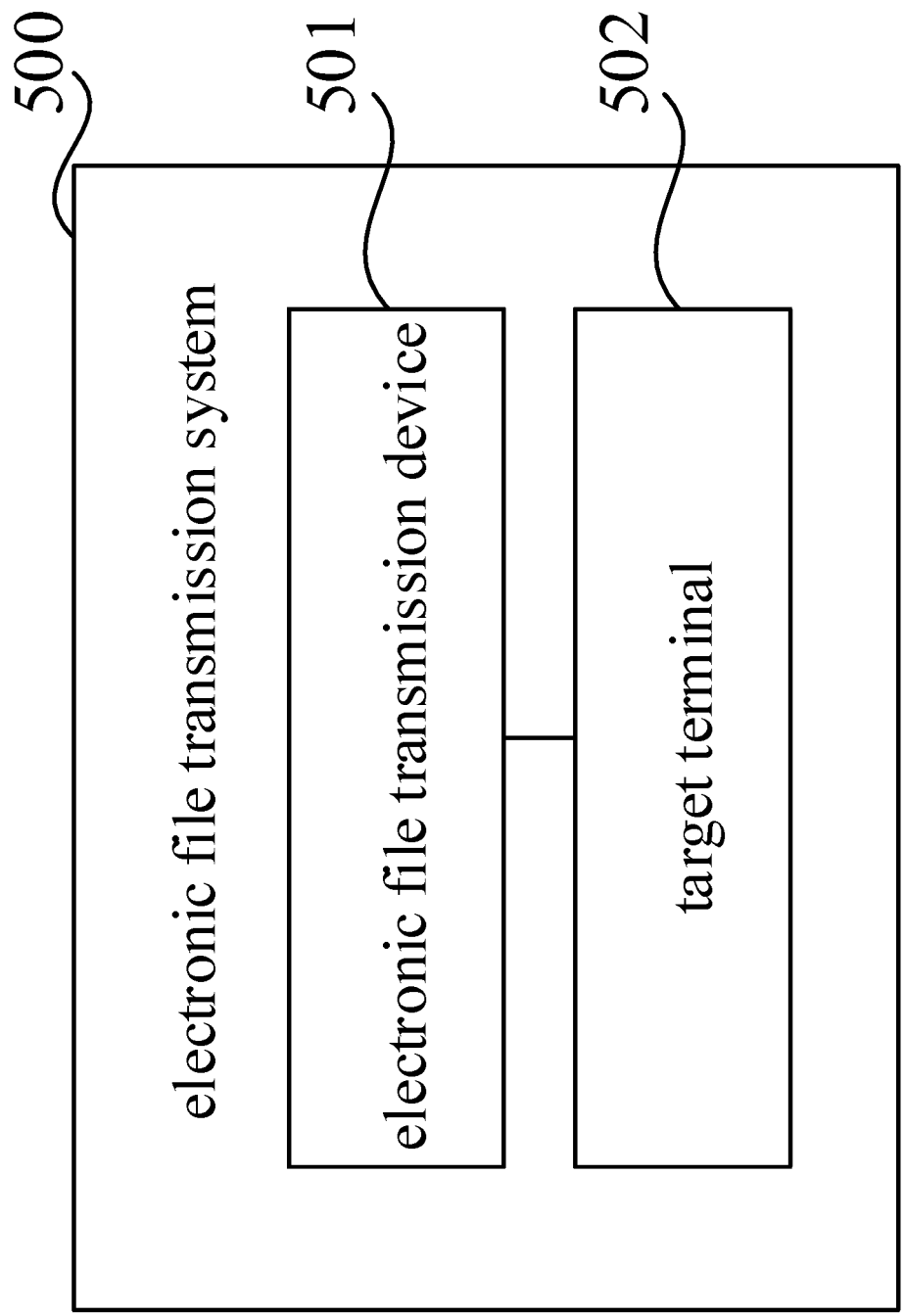
FIG. 5 is a block diagram of an electronic file transmission system according to an embodiment of the present disclosure.

FIG. 5 is a block diagram of an electronic file transmission system 500 according to an embodiment of the present disclosure. As shown in FIG. 5, the electronic file transmission system 500 includes an electronic file transmission device 501 and a target terminal 502. In an embodiment of the present disclosure, the electronic file transmission system 500 described above may further include a source server and a shopping terminal. In another embodiment of the present disclosure, the electronic file transmission system 500 described above may include a CDN network in addition to the source server and the shopping terminal. In still another embodiment of the present disclosure, the electronic file transmission system 500 described above may include a third-party server in addition to the source server and the shopping terminal. In still yet another embodiment of the present disclosure, the electronic file transmission system 500 may include a plurality of distributed servers in addition to the source server and the shopping terminal.

It should be noted that the electronic file transmission device 501 may be a background server as needed. The background server and the source server may be the same server or different servers. The target terminal 502 and the shopping terminal may be the same terminal or different terminals.

Figure 6:
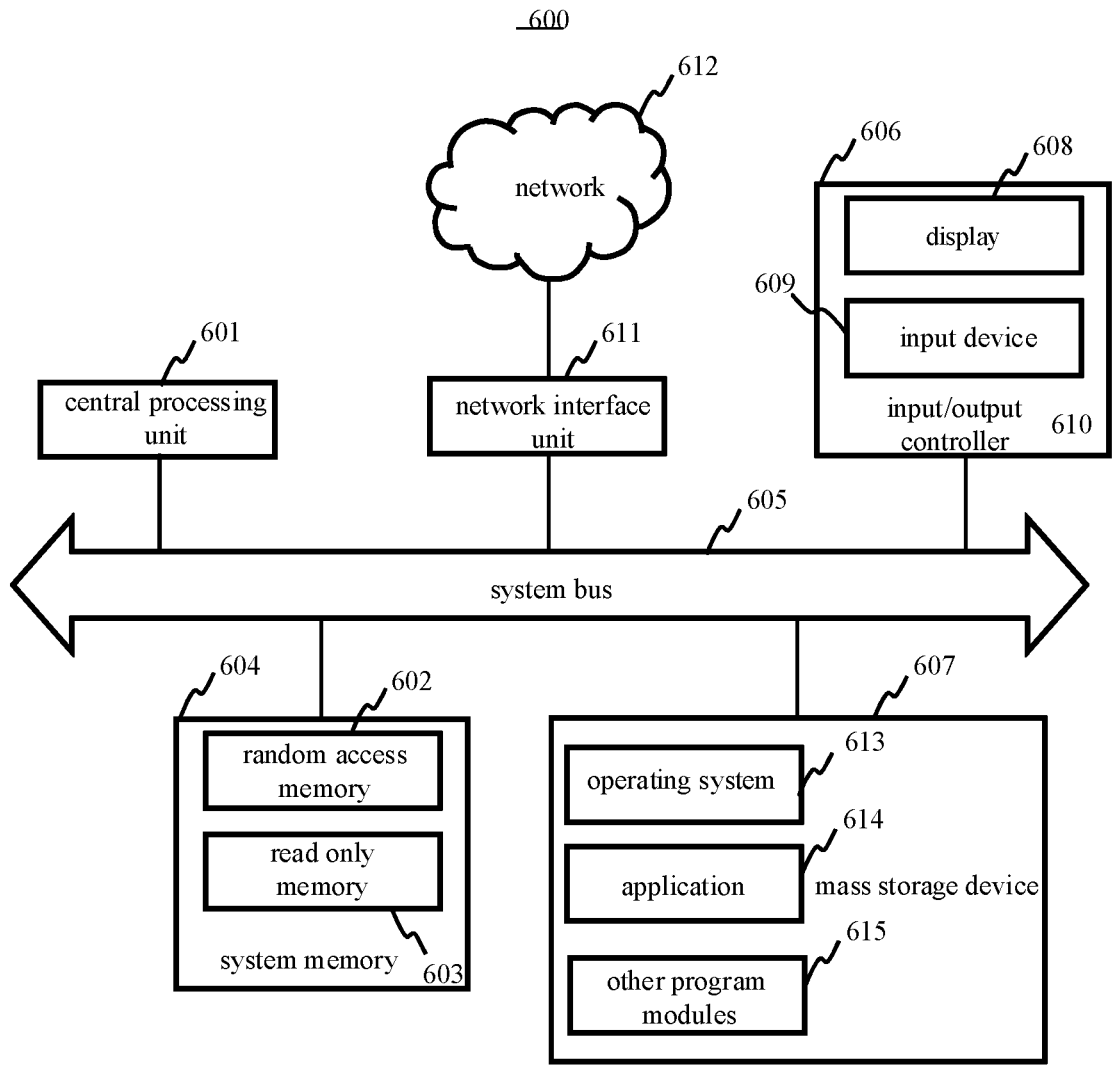
FIG. 6 is a block diagram of another electronic file transmission device according to an embodiment of the present disclosure.

FIG. 6 is a schematic structural diagram of an electronic file transmission device 600 according to an exemplary embodiment. The electronic file transmission device 600 includes a central processing unit (CPU) 601, a system memory 604 including random access memory (RAM) 602 and read only memory (ROM) 603, and a system bus 605 that connects the system memory 604 and the central processing unit 601. The electronic file transmission device 600 also includes a basic input/output system (I/O system) 606 that facilitates transmission of information between various components within a computer, and a mass storage device 607 for storing an operating system 613, applications 614, and other program modules 615.

The basic input/output system 606 includes a display 608 for displaying information and an input device 609 such as a mouse or keyboard for user input of information. The display 608 and the input device 609 are both connected to the central processing unit 601 via an input/output controller 610 that is coupled to the system bus 605. The basic input/output system 606 may also include the input/output controller 610 for receiving and processing input from a plurality of other devices, such as a keyboard, mouse, or electronic stylus, etc. Similarly, the input/output controller 610 also provides output to a display screen, printer, or other type of output device.

The mass storage device 607 is connected to the central processing unit 601 by a mass storage controller (not shown) connected to the system bus 605. The mass storage device 607 and its associated computer readable medium provide non-volatile storage for the electronic file transmission device 600. That is, the mass storage device 607 may include a computer readable medium (not shown) such as a hard disk or a CD-ROM drive.

The electronic file transmission device 600 may also include a power supply component 626 configured to perform power management of the electronic file transmission device 600, a wired or wireless network interface 650 configured to connect the electronic file transmission device 600 to the network, and an input/output (I/O) interface 658. The electronic file transmission device 600 may operate based on an operating system stored in the memory 632, such as Windows Server™, Mac OS X™, Unix™, Linux™, FreeBSD™, and the like.

Without loss of generality, the computer readable medium may include computer storage medium and communication medium. The computer storage medium includes volatile and nonvolatile, removable and non-removable medium implemented in any method or technology for storage of information such as computer readable instructions, data structures, program modules or other data. The computer storage medium include RAM, ROM, EPROM, EEPROM, flash memory or other solid state storage technologies, CD-ROM, DVD or other optical storage, tape cartridges, magnetic tape, magnetic disk storage or other magnetic storage devices. Of course, those skilled in the art will appreciate that the computer storage medium is not limited to the above. The system memory 604 and the mass storage device 607 described above may be collectively referred to as memory.

According to various embodiments of the present disclosure, the electronic file transmission device 600 may also be operated by a remote computer connected to the network through a network such as the Internet. That is, the electronic file transmission device 600 may be connected to the network 612 through a network interface unit 611 connected to the system bus 605, or may be connected to other types of networks or remote computer systems (not shown) using the network interface unit 611.

The memory further includes one or more programs. The one or more programs are stored in the memory. The central processing unit 601 implements the electronic file transmission method provided by the embodiments of the present disclosure by executing the one or more programs.

In an exemplary embodiment, there is also provided a non-transitory computer readable storage medium comprising instructions, such as a memory comprising instructions executable by the processor of the electronic file transmission device to perform the electronic file transmission method provided by embodiments of the present disclosure. For example, the non-transitory computer readable storage medium may be a ROM, a random access memory (RAM), a CD-ROM, a magnetic tape, a floppy disk, an optical data storage device, etc.

In an exemplary embodiment, a computer readable storage medium is also provided. The computer readable storage medium is a non-volatile storage medium having a computer program stored therein. When executed by a processor, the computer program in the computer readable storage medium may execute the electronic file transmission method provided by the embodiments of the present disclosure. For example, the method may include: receiving a first instruction for a target electronic file; after receiving the first instruction, dispatching the target electronic file from a first storage location on which it is stored currently to a second storage location, the network connectivity between the second storage location and a target terminal being better than the network connectivity between the first storage location and the target terminal; and after receiving the second instruction for the target electronic file, transmitting the target electronic file from the second storage location to the target terminal.

In an exemplary embodiment, a computer program product is also provided. The computer program product is stored thereon instructions that, when executed in a computer, cause the computer to execute the electronic file transmission method provided by the embodiments of the present disclosure. For example, the method may include: receiving a first instruction for a target electronic file; after receiving the first instruction, dispatching the target electronic file from a first storage location on which it is stored currently to a second storage location, the network connectivity between the second storage location and a target terminal being better than the network connectivity between the first storage location and the target terminal; and after receiving the second instruction for the target electronic file, transmitting the target electronic file from the second storage location to the target terminal.

In an exemplary embodiment, a chip is also provided. The chip may include programmable logic circuit and/or instructions. The chip, when operates, causes to execute the electronic file transmission method provided by the embodiments of the present disclosure. For example, the method may include: receiving a first instruction for a target electronic file; after receiving the first instruction, dispatching the target electronic file from a first storage location on which it is stored currently to a second storage location, the network connectivity between the second storage location and a target terminal being better than the network connectivity between the first storage location and the target terminal; and after receiving the second instruction for the target electronic file, transmitting the target electronic file from the second storage location to the target terminal.

Persons of ordinary skill in the art can understand that all or part of the steps described in the above embodiments can be completed through hardware, or through relevant hardware instructed by applications stored in a non-transitory computer readable storage medium, such as read-only memory, disk or CD, etc.

The foregoing descriptions are only exemplary embodiments of the present disclosure, and are not intended to limit the present disclosure. Within the spirit and principles of the disclosure, any modifications, equivalent substitutions, improvements, etc., are within the protection scope of appended claims of the present disclosure.

What is claimed is:

1. An electronic file transmission method, applied to an electronic file transmission device having historical dispatching records stored therein, comprising:
   receiving a first instruction for a target electronic file;
   querying, after receiving the first instruction, the historical dispatching records to determine whether the target electronic file has been dispatched to a second storage location;
   in response to a query result indicating that the target electronic file has not been dispatched to the second storage location, dispatching the target electronic file from a first storage location on which it is stored currently to the second storage location, a network connectivity between the second storage location and a target terminal being faster than a network connectivity between the first storage location and the target terminal;
   receiving a second instruction for the target electronic file; and
   transmitting the target electronic file from the second storage location to the target terminal after receiving the second instruction,
   wherein the target terminal is a shopping terminal,
   the first instruction comprises a first target instruction and a second target instruction;
   the first target instruction is one of the following instructions: an instruction to add the target electronic file to a shopping cart, and an instruction to put the target electronic file into favorites; and the second target instruction is an instruction to generate a purchase order including the target electronic file, wherein dispatching the target electronic file from the first storage location on which it is stored currently to the second storage location comprises:

dispatching the target electronic file from a first storage medium in the first storage location to a second storage medium in the first storage location when the first instruction is the first target instruction, an access speed of the first storage medium being lower than that of the second storage medium; and dispatching the target electronic file from the second storage medium to the second storage location when the first instruction is the second target instruction;

wherein the second storage medium is a solid-state hard disk and the first storage medium is one of a mechanical hard disk and a magnetic tape;

transmitting the target electronic file from a source server to an edge server of a content delivery network, and the source server is a storage server provided by a merchant that sells the electronic file on an electronic file shopping platform.

2. The method of claim 1, wherein dispatching the target electronic file from a first storage location on which it is stored currently to a second storage location comprises:

transmitting an electronic file acquisition request to a third-party server, the electronic file acquisition request being used to instruct the third-party server to return the target electronic file; and receiving the target electronic file returned by the third-party server, and storing the target electronic file in a source server.

3. The method of claim 2, wherein an Internet Protocol (IP) address of the third-party server is an IP address that is restricted from being accessed, and transmitting an electronic file acquisition request to a third-party server comprises:

transmitting the electronic file acquisition request to the third-party server through a virtual private network; and receiving the target electronic file returned by the third-party server comprises:

receiving, by the virtual private network, the target electronic file returned by the third-party server.

4. The method of claim 1, wherein dispatching the target electronic file from a first storage location on which it is stored currently to a second storage location comprises:

obtaining an IP address of the target terminal;

determining, according to the IP address of the target terminal, a target server of which the network connectivity with the target terminal satisfies a first connectivity requirement among a plurality of distributed servers that is predetermined; and transmitting the target electronic file from a source server to the target server.

5. The method of claim 4, wherein determining, according to the IP address of the target terminal, a target server of which the network connectivity with the target terminal satisfies a first connectivity requirement among a plurality of distributed servers that is predetermined comprises:

determining, according to the IP address of the target terminal, an operator of a network where the target terminal is located and a geographical area where the target terminal is located; and determining the target server from the plurality of distributed servers, an operator of the network where the target server is located being the same as the operator of the network where the target terminal is located, and a geographical area where the target server is located being the same as the geographical area where the target terminal is located.

6. The method of claim 1, wherein if the first instruction carries an identifier of a user, the target terminal is a terminal bound to the identifier of the user; and if an input terminal identifier is received, the target terminal is a terminal corresponding to the terminal identifier.

7. The method of claim 1, wherein dispatching the target electronic file from a first storage location on which it is stored currently to a second storage location comprises:

determining whether the network connectivity between the first storage location and the target terminal satisfies a second connectivity requirement; and dispatching the target electronic file from the first storage location on which it is stored currently to the second storage location when the network connectivity between the first storage location and the target terminal does not satisfy the second connectivity requirement.

8. The method of claim 7, wherein the determining whether the network connectivity between the first storage location and the target terminal satisfies a second connectivity requirement comprises:

transmitting a connectivity test instruction to the first storage location, and the first storage location acquires, after receiving the connectivity test command, a delay of a ping command response of the target terminal to the first storage location;

determining whether the delay is greater than a predetermined delay threshold;

determining, when the delay is greater than the predetermined delay threshold, that the network connectivity between the first storage location and the target terminal does not satisfy the second connectivity requirement, and determining, when the delay is not greater than the predetermined delay threshold, that the network connectivity between the first storage location and the target terminal satisfies the second connectivity requirement.

9. The method of claim 1, wherein the method further comprises:

in response to a query result indicating that the target electronic file has been dispatched to the second storage location, the step of dispatching the target electronic file from a first storage location on which it is stored currently to the second storage location is not performed.

10. The method of claim 1, wherein the method further comprises:

in response to a user logging in to the electronic file shopping platform in the shopping terminal based on an account information thereof, triggering the shopping terminal to send the first instruction to the electronic file transmission device, the first instruction carrying the account information of the user, the account information being an identifier of the user, and determining, by the electronic file transmission device, a terminal pre-bound with the account information according to the account information of the user;

determining the terminal as the target terminal, and acquiring an IP address of the target terminal.

11. The method of claim 1, wherein the method further comprises:
dispatching, when receiving a plurality of the first instructions for different electronic files, different electronic files from the first storage location to the second storage location in an order in which the first instructions are received.

12. The method of claim 1, wherein transmitting the target electronic file from a source server to an edge server of a content delivery network comprises:
transmitting a content delivery network dispatching instruction for the target electronic file to the source server, such that the source server transmitting the target electronic file to at least one edge server of the content delivery network after receiving the content delivery network dispatching instruction.

13. A nonvolatile computer-readable storage medium of an electronic file transmission device having stored therein instructions that, when executed by a processor, implement an electronic file transmission method, comprising:
receiving a first instruction for a target electronic file;
querying, after receiving the first instruction, a historical dispatching records to determine whether the target electronic file has been dispatched to a second storage location;
in response to a query result indicating that the target electronic file has not been dispatched to the second storage location, dispatching the target electronic file from a first storage location on which it is stored currently to the second storage location, a network connectivity between the second storage location and a target terminal being faster than a network connectivity between the first storage location and the target terminal;
receiving a second instruction for the target electronic file; and
transmitting the target electronic file from the second storage location to the target terminal after receiving the second instruction,
wherein the target terminal is a shopping terminal,
the first instruction comprises a first target instruction and a second target instruction;
the first target instruction is one of the following instructions: an instruction to add the target electronic file to a shopping cart, and an instruction to put the target electronic file into favorites; and
the second target instruction is an instruction to generate a purchase order including the target electronic file,
wherein dispatching the target electronic file from the first storage location on which it is stored currently to the second storage location comprises:
dispatching the target electronic file from a first storage medium in the first storage location to a second storage medium in the first storage location when the first instruction is the first target instruction, an access speed of the first storage medium being lower than that of the second storage medium; and
dispatching the target electronic file from the second storage medium to the second storage location when the first instruction is the second target instruction;
wherein the second storage medium is a solid-state hard disk and the first storage medium is one of a mechanical hard disk and a magnetic tape;
transmitting the target electronic file from a source server to an edge server of a content delivery network, and the source server is a storage server provided by a merchant that sells the electronic file on an electronic file shopping platform.

14. An electronic file transmission device having historical dispatching records stored therein, comprising:
one or more processors; and
a memory;
wherein the memory stores one or more programs configured to be executed by the one or more processors, and the one or more programs comprise instructions for performing the following operations:
receiving a first instruction for a target electronic file;
querying, after receiving the first instruction, the historical dispatching records to determine whether the target electronic file has been dispatched to a second storage location;
in response to a query result indicating that the target electronic file has not been dispatched to the second storage location, dispatching the target electronic file from a first storage location on which it is stored currently to the second storage location, a network connectivity between the second storage location and a target terminal being faster than a network connectivity between the first storage location and the target terminal;
receiving a second instruction for the target electronic file; and
transmitting the target electronic file from the second storage location to the target terminal after receiving the second instruction, wherein the target terminal is a shopping terminal,
the first instruction comprises a first target instruction and a second target instruction;
the first target instruction is one of the following instructions: an instruction to add the target electronic file to a shopping cart, and an instruction to put the target electronic file into favorites; and
the second target instruction is an instruction to generate a purchase order including the target electronic file,
wherein dispatching the target electronic file from the first storage location on which it is stored currently to the second storage location comprises:
dispatching the target electronic file from a first storage medium in the first storage location to a second storage medium in the first storage location when the first instruction is the first target instruction, an access speed of the first storage medium being lower than that of the second storage medium; and
dispatching the target electronic file from the second storage medium to the second storage location when the first instruction is the second target instruction;
wherein the second storage medium is a solid-state hard disk and the first storage medium is one of a mechanical hard disk and a magnetic tape;
transmitting the target electronic file from a source server to an edge server of a content delivery network, and
the source server is a storage server provided by a merchant that sells the electronic file on an electronic file shopping platform.

15. The electronic file transmission device according to claim 13, wherein the one or more programs comprise instructions for performing the following operations:
transmitting an electronic file acquisition request to a third-party server, the electronic file acquisition request being used to instruct the third-party server to return the target electronic file; and receiving the target electronic file returned by the third-party server, and storing the target electronic file in a source server.

16. An electronic file transmission system, comprising: an electronic file transmission device and a target terminal;
wherein the electronic file transmission device has historical dispatching records stored therein and comprises:
one or more processors; and
a memory;
wherein the memory stores one or more programs configured to be executed by the one or more processors, and the one or more programs comprise instructions for performing the following operations:
receiving a first instruction for a target electronic file;
querying, after receiving the first instruction, the historical dispatching records to determine whether the target electronic file has been dispatched to a second storage location;
in response to a query result indicating that the target electronic file has not been dispatched to the second storage location, dispatching the target electronic file from a first storage location on which it is stored currently to the second storage location, a network connectivity between the second storage location and a target terminal being faster than a network connectivity between the first storage location and the target terminal;
receiving a second instruction for the target electronic file; and
transmitting the target electronic file from the second storage location to the target terminal after receiving the second instruction,
wherein the target terminal is a shopping terminal,
the first instruction comprises a first target instruction and a second target instruction;
the first target instruction is one of the following instructions: an instruction to add the target electronic file to a shopping cart, and an instruction to put the target electronic file into favorites; and
the second target instruction is an instruction to generate a purchase order including the target electronic file,
wherein dispatching the target electronic file from the first storage location on which it is stored currently to the second storage location comprises:
dispatching the target electronic file from a first storage medium in the first storage location to a second storage medium in the first storage location when the first instruction is the first target instruction, an access speed of the first storage medium being lower than that of the second storage medium; and
dispatching the target electronic file from the second storage medium to the second storage location when the first instruction is the second target instruction;
wherein the second storage medium is a solid-state hard disk and the first storage medium is one of a mechanical hard disk and a magnetic tape;
transmitting the target electronic file from a source server to an edge server of a content delivery network, and
the source server is a storage server provided by a merchant that sells the electronic file on an electronic file shopping platform.

* * * * *